J. H. CONNELLY.
Apparatus for Extinguishing Fires.
No. 161,388. 2 Sheets--Sheet 1.
Patented March 30, 1875.
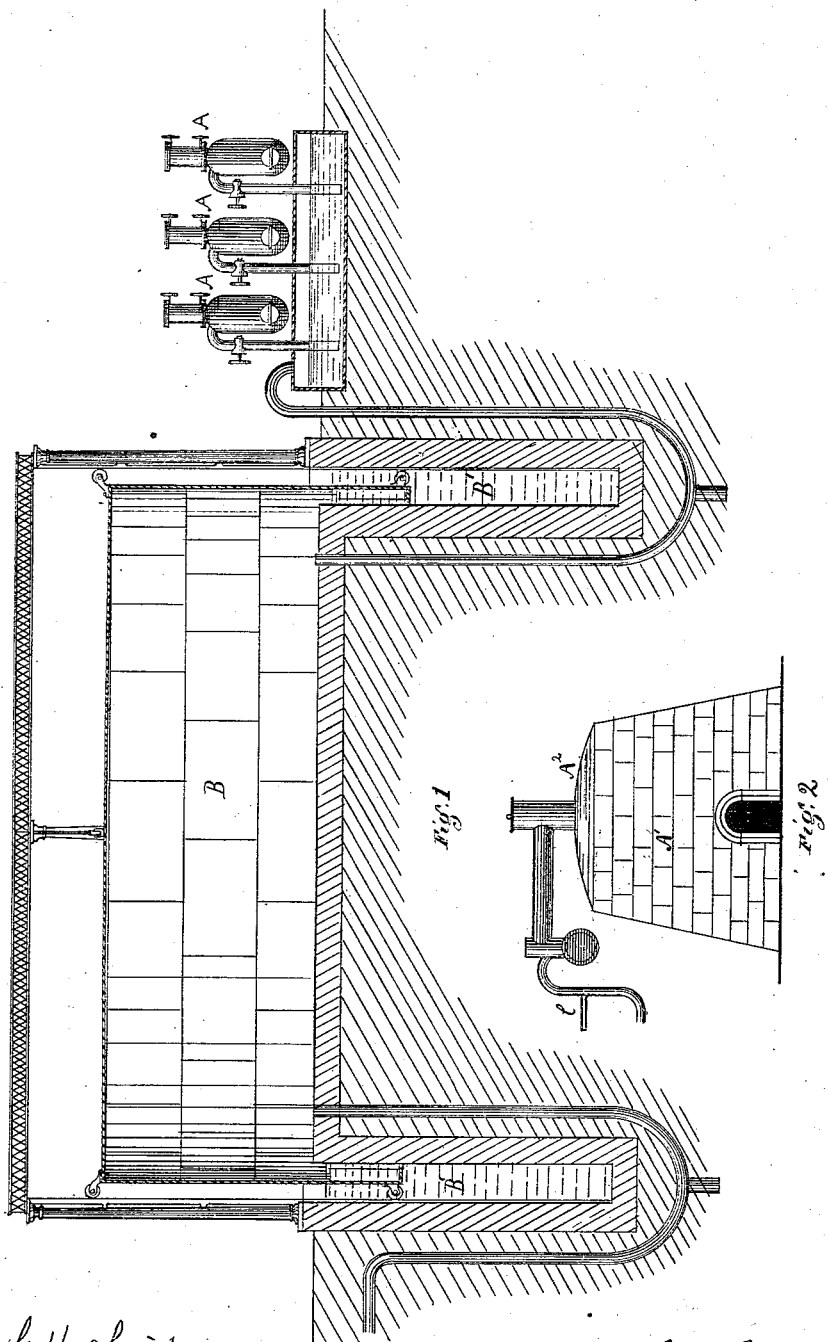

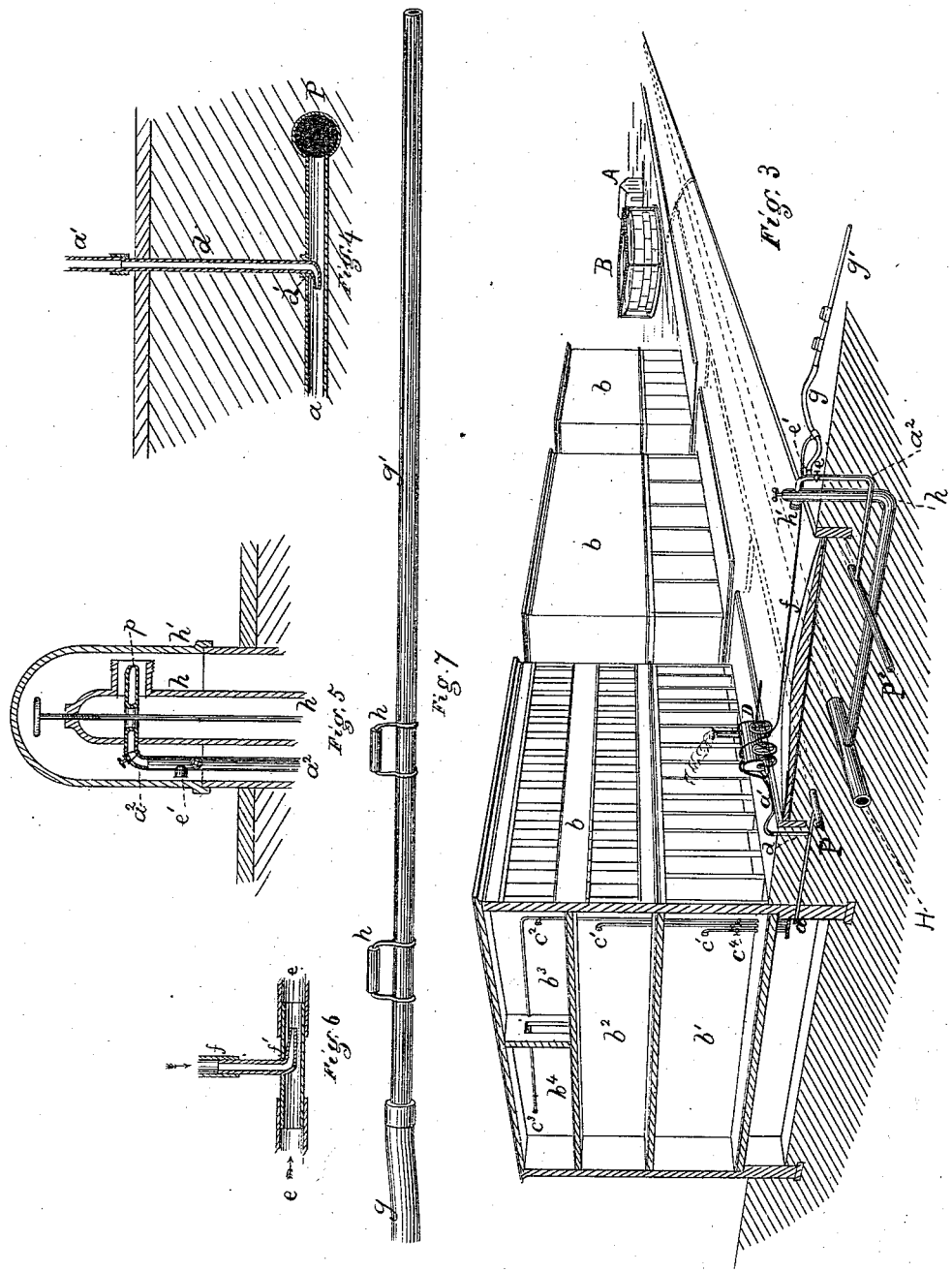

UNITED STATES PATENT OFFICE.

JOSEPH H. CONNELLY, OF NEW BRIGHTON, PENNSYLVANIA.

IMPROVEMENT IN APPARATUS FOR EXTINGUISHING FIRES.

Specification forming part of Letters Patent No. 161,388, dated March 30, 1875; application filed January 25, 1875.

*To all whom it may concern:*

Be it known that I, JOSEPH H. CONNELLY, of New Brighton, county of Beaver, State of Pennsylvania, have invented or discovered a new and useful Improvement in Apparatus for Extinguishing Fires; and I do hereby declare the following to be a full, clear, concise, and exact description thereof, reference being had to the accompanying drawing, making a part of this specification, in which—like letters indicating like parts—

Figure 1, Sheet 1, is a sectional elevation of a gas-holder, with gas-generators and connecting-pipes in outside view. Fig. 2, Sheet 1, is a reduced view, in elevation, of a limekiln or calcining-oven, inclosed or covered, so as to collect and save the gas generated therein. Fig. 3, Sheet 2, illustrates the application of my invention, and the arrangement of the several parts thereof in a system of fire-extinguishing apparatus, particularly useful in cities, villages, and populous towns; and Figs. 4 to 7 are detached views, hereinafter explained.

My invention consists in the construction of a system of apparatus, and in the combinations of certain parts thereof, by means of which carbonic-acid gas is generated, stored, and transmitted throughout any or all parts of a closely-inhabited place, and directly to any or all the rooms of each separate building, so as to furnish, either alone or in connection with a supply of water or steam intermingled therewith, a ready means for extinguishing fires, with, as compared with water, little or no damage over and above that done by the fire itself.

Carbonic-acid gas, steam, and water are all well-known agents for putting out fires; but of the three that first named is by far the most effective. In a fire where a very great heat is generated, such as often occurs, water and steam in limited quantities are decomposed, and add fuel to the fire.

Carbonic-acid gas and water have been used in connection with portable apparatus; but until my invention no fixed and general system of apparatus for generating, storing, transmitting, and utilizing such gas as such agent had, to my knowledge, been devised.

At A A A, Fig. 1, I have shown a series of generators, of ordinary construction, for the generation of carbonic-acid gas, with suitable connections through a purifier to the gas-holder B, where it is stored, ready for use. Or, when the calcining of lime is carried on within reasonable proximity, as in limekilns $A^1$, the same may be covered by a cover, $A^2$; and, by a suitable arrangement of pipes through a hydraulic main with an ejector-connection, $l$, the gas generated therein in the calcining operation may be conducted off to, and stored in, the holder, as before.

In Fig. 3, A represents the generating-house or calcining-oven, and B the gas-holder.

In applying my improvement in closely-settled localities one or more gas pipes, P P', are laid from the holder along the street or streets, and by a service-branch, $a$, therefrom each building $b$ and each story $b^1\ b^2$, or each room $b^3\ b^4$, as may be desired, has a supply-pipe, $c$ $c^1\ c^2\ c^3$, leading thereto, so that by the turning of a cock the gas can be turned on at or near the desired spot in case of a fire.

The cocks may be arranged at any convenient part of the building, as $c^4$, and hose may be employed on the discharge ends of these pipes, in the usual way and for the usual purposes; or they may be made, as shown, with open mouths, so as to discharge freely on the turning of the proper cock or cocks. Each pipe $c\ c^1\ c^2$, it will be observed, has an independent connection with the service-pipe $a$.

While such gas is itself a powerful agent in extinguishing fires, it is better, for some reasons, (chiefly economic,) to combine steam or water therewith, so that, both escaping or being ejected together, they shall co-operate in putting out the fire. For this purpose the steam of a stationary boiler may be employed, where there happens to be one in, or about, or within a convenient distance of, the building; but in other cases reliance may be placed on a portable boiler, D, preferably constructed for the purpose.

The steam-pipe $a^1$ from the boiler is connected to a fixed pipe, $d$, which is fixedly arranged in the street or sidewalk, and which has an ejector-connection, illustrated at $d'$, Fig. 4, with the service-pipe $a$, or other pipe in the line of connection from the street-main P to the point of discharge. The force of the escaping steam co-operates with the gas-pressure, and the two escaping together coact in carrying out the purpose in view.

In order to use this gas in connection with water as it flows from the hydrant-main H an apparatus such as is shown in Fig. 5 may be employed. From the main H a service-pipe, $h$, leads to the fire-plug $h'$, onto the discharge-nozzle of which a hose may be coupled in the usual way. From the carbonic-acid-gas main P′ a branch pipe, $a^2$, leads up, and, by an ejector-nozzle, $p$, arranged in the line or direction of water-outflow, charges the escaping water with the gas, so that both will be transmitted by the pressure, or under other usual pressure, to the locality desired; but I use the ejector and steam-jet not only in connection with the fixed house or building pipe, fixtures, but also combine it with the carbonic-acid-gas pipe by means of a hose-connection, so that with the usual hose and nozzle appliances a stream of commingled steam and gas may be carried any desired distance or to any desired point, and caused to play on the fire in like manner as is now practiced with steam fire-engines. For this purpose a branch connection is made, by a hose-coupling, $e$, to the gas-pipe at $e'$, and into this hose-connection $e$ a jet of steam is brought from the boiler D (or from a stationary boiler, if one is sufficiently near) by a pipe, $f$, and ejector $f'$, as illustrated in Fig. 6, the ejector discharging in all cases in the direction in which the flow is desired. The hose $g$, leading therefrom to the place where the stream is to be directed onto the fire, is of the desired length, and terminates in a nozzle, $g'$. As this nozzle is liable to become heated by the steam passing through I arrange thereon one or more handles, $h$, made of wood, or other suitable material which is not liable to become unduly heated in such use. The pipes employed are fitted with the necessary cocks for turning on and off, and regulating the flow or supply, as may be desired.

For the purposes of my improvement the ordinary limekilns or calcining-ovens are to be considered as the mechanical equivalents of the generators, and where the generators are employed the usual or any known materials are employed, except that I use muriatic acid as well as sulphuric acid; also, where the gas is taken from the limekiln, it will aid considerably in conducting it off to the holder to introduce an ejector and steam-jet in the line of communication from one to the other, and such combination of devices I make wherever I find it desirable. I also find it advantageous to make the gas-holder with a seal, B′, two or three feet in depth, more or less, in order to secure a heavy pressure in the discharge of the gas, though it should not be so heavy as to interfere seriously with the storing of the gas as generated.

What I claim as my invention, and desire to secure by Letters Patent, is—

1. In combination with the system of gas-mains, distributing-pipes, holder, valves, and independent connections to the several rooms or compartments to be protected, one or more fixed or permanent carbonic-acid-gas generators, A A, connected therewith, with intermediate purifiers, substantially as set forth.

2. In combination with the main, service, and distributing pipes of a carbonic-acid-gas apparatus for extinguishing fires, an ejector-nozzle arranged therein for supplying a jet of steam thereto, substantially as set forth.

3. An ejector, $f'$, arranged in the line of hose from the service-pipe, with a steam-pipe connection thereto from the steam-generator, substantially as described.

4. The combination of a carbonic-acid-gas service-pipe and a fire-plug, arranged relatively to each other substantially as set forth, with reference to Fig. 5.

In testimony whereof I have hereunto set my hand.

JOSEPH H. CONNELLY.

Witnesses:
JAMES M. CHRISTY,
CHAS. G. PAGE.